March 20, 1951 G. B. WATKINS 2,545,906
MULTIPLE GLASS SHEET GLAZING UNIT HAVING
ENCLOSED ANGLED METAL SLATS
Filed Dec. 11, 1944

Inventor
GEORGE B. WATKINS.
By
Frank Fraser
Attorney

Patented Mar. 20, 1951

2,545,906

UNITED STATES PATENT OFFICE 2,545,906

MULTIPLE GLASS SHEET GLAZING UNIT HAVING ENCLOSED ANGLED METAL SLATS

George B. Watkins, Toledo, Ohio, assignor to Libbey-Owens-Ford Glass Company, Toledo, Ohio, a corporation of Ohio Application December 11, 1944, Serial No. 567,694

1 Claim. (Cl. 88—60)

The present invention relates to multiple glass sheet glazing units and particularly to a unit provided with a built-in light screening device.

Properly made, double glazing units make it feasible to install large glass areas in buildings without incurring substantial additional heat loss. One type of house, for example, is designed on a principle whereby the building arrangement is so oriented with respect to the sun that solar radiation is effectively used to heat or assist in heating the dwelling. To prevent excessive sunlight during certain periods of the year, it is well to provide means for limiting the amount of sunlight permitted to enter the building. This is ordinarily done by placement of shrubbery or trees, use of awnings, canopies, and such devices.

There are many types of glass installations such as in transoms, rear windows of automobiles, large windows and wall areas in general, where an abundance of natural daylight or a wide range of vision is desired and which, if provided, introduces the problem of excessive light or glare at certain periods of the year and day.

The main object of the present invention is to provide a construction of multiple glass sheet glazing unit in which a screening or light controlling device is permanently mounted between the glass sheets. Preferably, the complete unit is composed entirely of glass and metal so that it will have a long life of usefulness and not be subject to deterioration such as may be expected when organic materials are used and exposed to the normal temperature, humidity, and other conditions.

Fundamentally, the glass sheets are spaced apart by a metal member firmly adherent to the glass sheets entirely around their marginal portions to create a permanently sealed space therebetween containing properly conditioned air. In accordance with my invention, a screening member, preferably all metal, is mounted within the space and is carried by the metal separator portion. The screening device is so designed and constructed that substantial light is permitted to pass through the finished unit in a controlled manner, while objectionable direct light is prevented from passing through the glazing unit. At the same time good vision through the unit is permitted, so that the advantages of a transparent opening are retained but unwanted excessive light is prevented or overcome.

Other objects and advantages of the invention will become more apparent during the course of the following description when taken in connection with the accompanying drawings.

In the drawings wherein like numerals are employed to designate like parts throughout the same:

Figure 1:
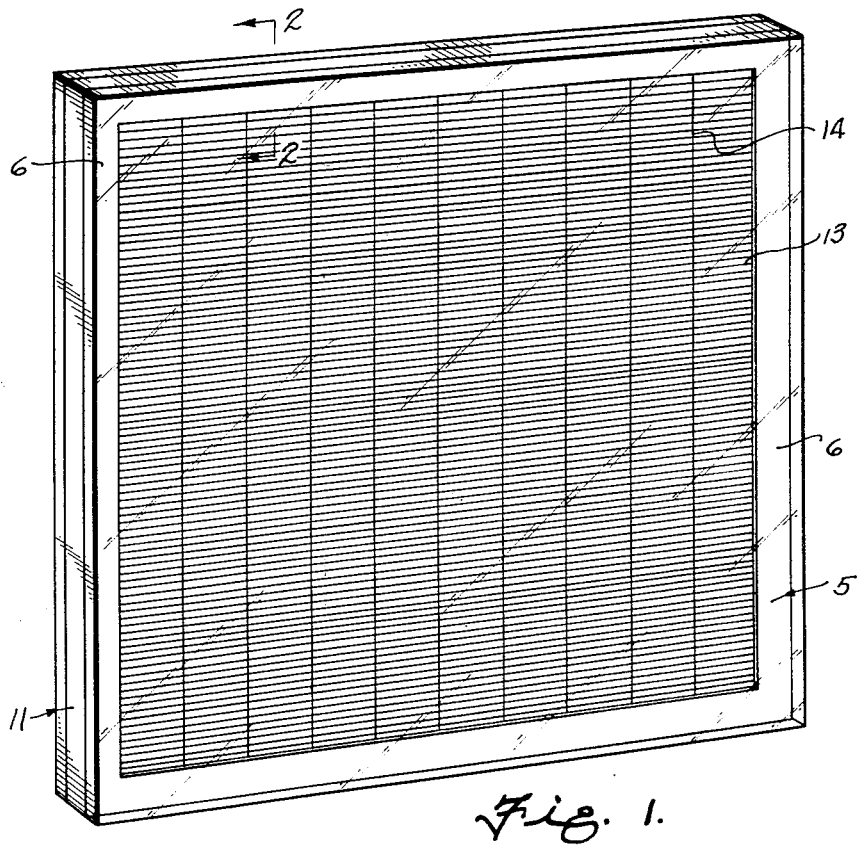
Fig. 1 is a perspective view of a complete unit including one form of self-contained screening device.

The unit illustrated in Fig. 1 is rectangular in shape and indicates a type of unit which may be used to glaze a window of a building, but it should be remembered the units can be made to any desired size and shape. The illustrated construction must be made to final size and shape as they cannot be altered after fabrication without risk of damage. It is composed of two sheets of glass 5 which may be ordinary plate or window glass of the desired thickness, or can be a glass having special characteristics, such as heat-strengthened glass, tinted glass, ultraviolet transmitting or absorbing glass, etc.

Figure 2:
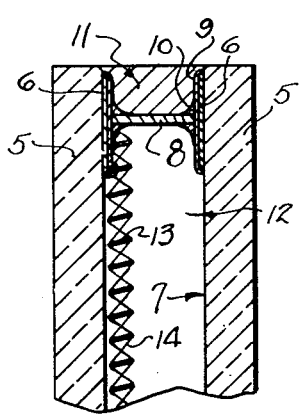
Fig. 2 is an enlarged sectional view taken on the line 2—2 of Fig. 1.
Figure 4:
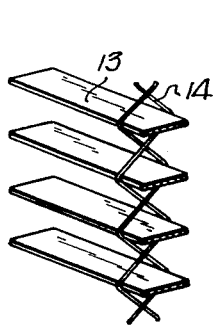
Fig. 4 is an enlarged fragmentary perspective view, partially in section, of one type of screening member which can be employed.

When producing the unit, the glass sheets are cut to size, necessary edge work done, and those surfaces which will be inwardly of the assembly are cleaned. A band of metal coating or film 6 is then applied on one surface as illustrated in Fig. 2, completely around the marginal portions of each sheet. One practical coating and method of applying it is to use a wire having a composition substantially—titanium 1.75 to 2.25%, chromium .40 to .60%, and the balance copper, which may be sprayed upon the glass by means of a metallizing gun. After the metal deposits have been placed upon the glass, the inner surfaces 7 of the glass sheets are given a final cleaning and inspection.

A metal separator strip or web 8, which may be lead tape or equivalent, is soldered to the copper coatings 6, and a satisfactory construction has been found to be one wherein the solder films 9 cover the copper coatings and solder fillets 10 are created where the edges of the lead contact the coatings. The resulting separator comprises the combination of coatings on the glass, spacer, and solder, forming an all metal structural spacing and joining member or strip which is approximately H-shape in cross section. Of course the web or separator strip 8 may be positioned in any desired relation with respect to the films 6, but I prefer to have it approximately centrally of the coatings as shown for structural reasons, and also because it creates a channel or groove outwardly thereof in which may be placed a plastic "seal" material 11.

After the glass sheets have been associated with the separator means and before the seal 11 is put in place, the web 8 is punctured with a needle at least in two places so that clean, dry air may be passed through the space 12 to remove moisture and to make it possible to leave sealed within the unit clean, dry air. For ordinary purposes, the pressure of the air sealed within the unit is at normal atmospheric pressure, but the air or inert gases may be sealed in at, above, or below normal atmospheric pressure. The needle openings are soldered closed promptly after the needles have been withdrawn.

This type of construction will withstand normal conditions of use, and the all metal separator firmly adherent to the glass prevents leakage or diffusion of moisture into the space 12 disposed between the glass sheets.

In accordance with the present invention, during fabrication of the unit, a light screening member is permanently mounted between the glass sheets. The screening device shown may be likened to a Venetian blind and comprises the slats 13 held together by the twisted strands 14. Although the slats may be made from any suitable type of material, I prefer that both the slats and strands be of metal, such as copper, or bronze, to prevent decomposition when in use. For example, if certain plastics were to be used, the action of the sun would ultimately result in such decomposition as to throw off vapors or gases which would be destructive to the conditions within the unit, and as the interior of the unit cannot be cleaned, the wisdom of employing permanently stable materials will be appreciated.

The arrangement of the slats can of course be varied. I have found a very satisfactory unit to be one in which the horizontal flat wires 13 have a width of approximately $\frac{1}{32}$ of an inch and are set at an angle of 17 degrees, with the measurement between the flat wires being equivalent to 18 mesh. The holding wires or strands 14 are relatively fine and of sufficient strength to properly maintain the slats in adjusted alignment. When this type of screening device is used, it is preferably placed within the unit so that the slats 13 will be horizontal when the unit is in use.

Figure 3:
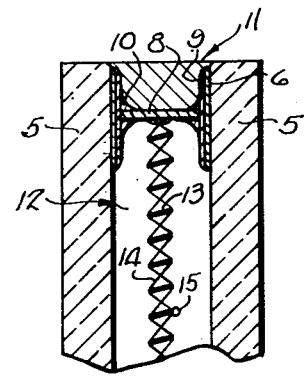
Fig. 3 is a similar view showing a slightly modified construction.

To mount the screen in position, it may, during fabrication of the unit, be soldered to the coatings on the glass as shown in Fig. 2, or to the web 8 as shown in Fig. 3. The screen may be soldered at its upper end only as shown, so that it literally hangs in the space between the two glass sheets, if desired. Preferably, however, it is soldered at intervals along two opposite edges (top and bottom in the drawings) to secure all or any number of the holding wires 14 to the separator strip. In certain installations, where it is necessary to even more positively and permanently locate the screen in the unit, one or more of the horizontal flat wires 13 may have one or both of its ends attached to the separator strip with a drop of solder, for anchoring purposes only. (As shown at 15 in Fig. 3.) When mentioning soldering, it is assumed that the screening material is a metal which can be soldered. If other types of materials are used, of course appropriate cementing or bonding means must likewise be selected.

Although normally a Venetian blind is adjustable, its principle of light control is well understood, so for purposes of explanation the particular screening member illustrated may be referred to as a fixed opening Venetian blind. It permits substantial passage of light and likewise enables an observer to see through the opening, but is effective in reducing glare and excessive direct light. The angularity of the slats of the screen can be adjusted during its manufacture to meet any particular condition of use, and it is contemplated that in many instances where a large opening is glazed with such units, the angularity of the light controlling devices may be different in the several units depending upon the height of installation.

The type of glazing unit described herein and without the screening device, gives protection against two kinds of transfer, namely conduction and convection. The addition of a screening member, of the character disclosed by me, built into the unit provides a safeguard against the passage of excessive solar radiation through the window during that period of the year when it is not desired. In the summer months when the sun is "high," the slats act as a barrier to a substantial part of the radiant energy by reflecting it back to the outside of the window. When the sun is "lower," as in the winter months, substantially all of its radiation will pass between the slats and into the interior of the building which is as desired. Thus, the size and arrangement of the slats can be controlled at time of manufacture to give a nice balance between winter and summer solar radiation conditions for any given location.

It is to be understood that the form of the invention herewith shown and described is to be taken as the preferred embodiment of the same, and that various changes in the shape, size and arrangement of parts may be resorted to without departing from the spirit of the invention or the scope of the subjoined claim.

I claim:

A multiple glass sheet glazing unit of the character described, comprising two spaced parallel sheets of glass, metallic coatings around the marginal portions of the opposed surfaces of said glass sheets and firmly adherent thereto, a metal spacer strip arranged between the glass sheets and secured to the metallic coatings, and a light modifying screen including a plurality of horizontally arranged angled metal slats and a series of spaced vertical wires positioned between the glass sheets closer to one glass sheet than to the other and having the vertical wires thereof soldered to the metallic coating on the marginal portion of the closer glass sheet.

GEORGE B. WATKINS.

REFERENCES CITED

The following references are of record in the file of this patent:

UNITED STATES PATENTS

| Number | Name | Date |
|---|---|---|
| 737,178 | Wadsworth | Aug. 25, 1903 |
| 2,107,994 | Hazelton | Feb. 8, 1938 |
| 2,179,763 | Smolowitz | Nov. 14, 1938 |
| 2,194,222 | Ewing | Mar. 19, 1940 |
| 2,235,680 | Haven | Mar. 18, 1941 |
| 2,322,591 | Rapp | June 22, 1943 |
| 2,382,566 | Heckman | Aug. 14, 1945 |